May 14, 1935.  J. BIJUR  2,000,913
LUBRICATION OF MACHINERY
Filed May 5, 1930  3 Sheets-Sheet 1
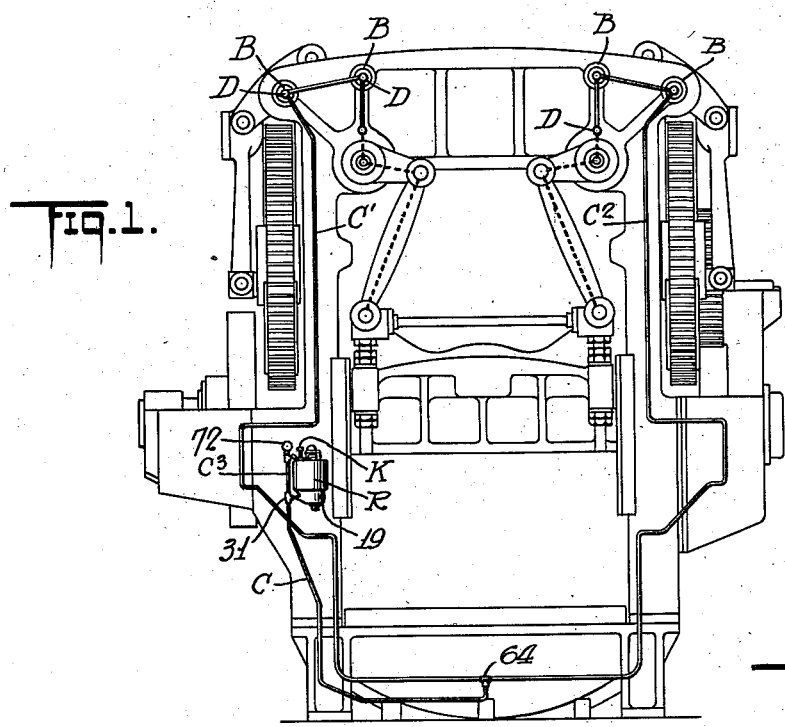
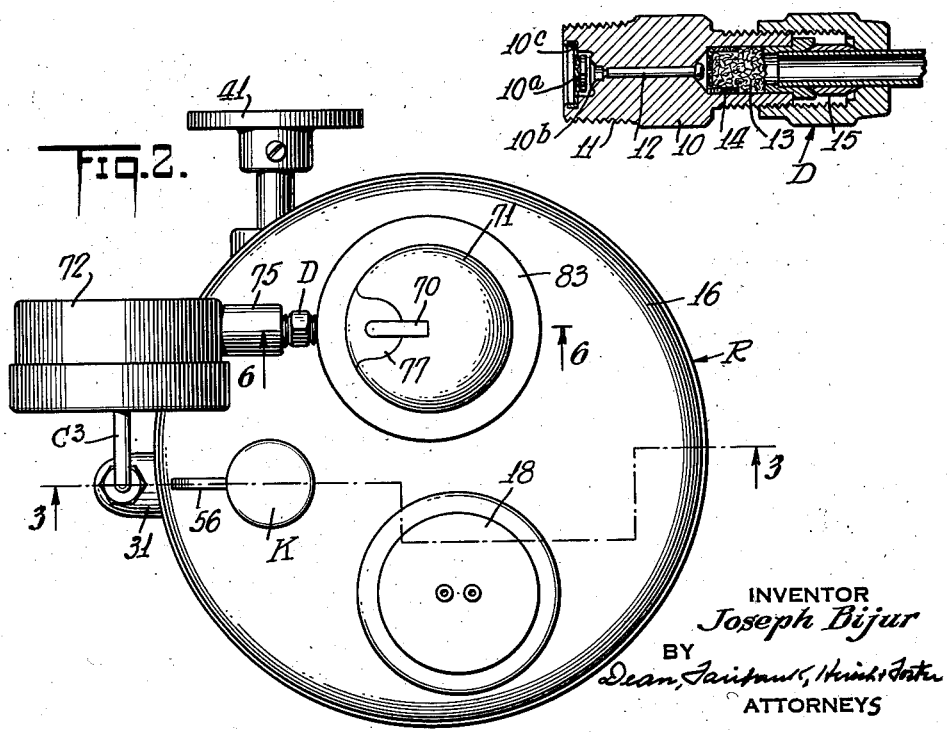
INVENTOR
Joseph Bijur
BY
ATTORNEYS

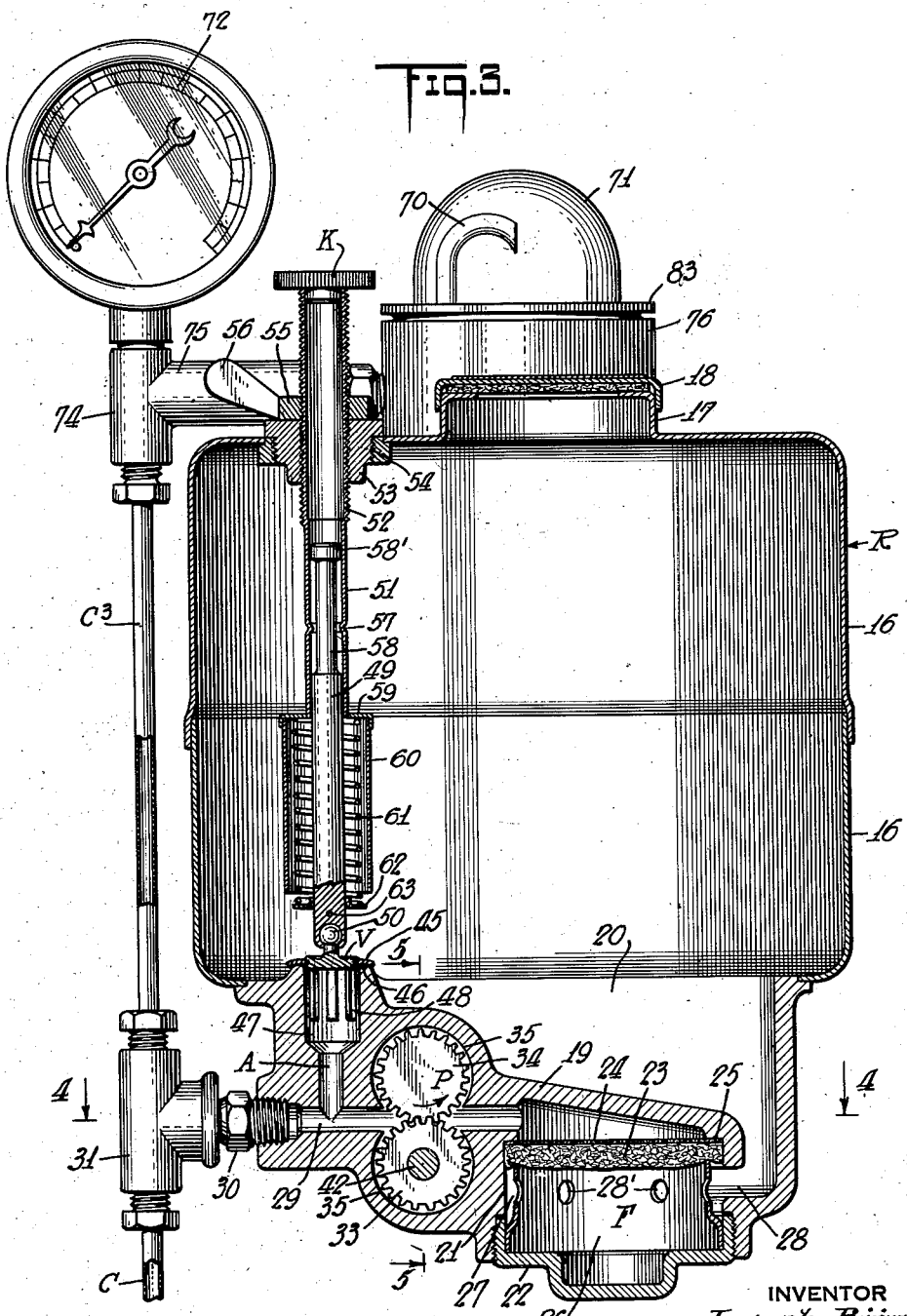

May 14, 1935.     J. BIJUR     2,000,913

LUBRICATION OF MACHINERY

Filed May 5, 1930     3 Sheets-Sheet 3

INVENTOR
Joseph Bijur
BY
ATTORNEYS

Patented May 14, 1935

2,000,913

UNITED STATES PATENT OFFICE 2,000,913

LUBRICATION OF MACHINERY

Joseph Bijur, New York, N. Y., assignor to Auto Research Corporation, a corporation of Delaware Application May 5, 1930, Serial No. 449,764

18 Claims. (Cl. 184—7)

My present invention is concerned with the lubrication of machinery. While capable of a diversified range of utility, it is primarily intended to simplify the lubrication of stationary machines; such for instance, as those used for shop or factory equipment.

An object of the invention is to assure correct proportional distribution of lubricant to each and every bearing of a machine, group of machines or complete plant to be lubricated, and moreover to assure flow of the desired total volume of lubricant to the bearing surfaces during any period of operation of the machine or plant.

Another object is to provide a lubricating installation requiring no material alteration in the construction of the lubricated machine or plant, and capable of substantially universal application to machines or groups of machines of various types or having a diverse range of lubrication requirements; and under all operating conditions of the lubricated apparatus, to accomplish the supply of lubricant continuously and automatically from a central source, without the need for inspection or manipulation of fittings at the bearings.

Another object is to provide a simple system which prevents a wasteful leak of oil to the bearings when the machine is not running, yet which requires no manual opening and closing of flow valves when the machine is started or stopped.

Another object is to provide a system of the character noted above in which a single control adjustment is all that is required to compensate for variation in the flow of lubricant to all the bearings regardless of whether such variation has been caused by a change in the condition of the lubricant or in the condition of the apparatus which handles it.

Among the changes which may affect such rate and which may be compensated for by the single adjustment are changes in grade of lubricant used, changes in viscosity due to temperature variations, or changes in the efficiency of the pump due to wear, for instance.

Another object is to provide means, in the nature of an indicator, for aiding in the initial setting of the control means to insure the desired flow rate to the respective bearings.

Another object is to provide a secondary readily readable indicating means which will show at a glance whether or not the flow rate has varied from the rate initially set, or in other words, indicate whenever resetting of the single adjustment is required in order to compensate for variations in the flow rate due to any and all causes.

More specifically the invention is especially concerned with lubricating systems and methods of the character in which lubricant from a central source is forced under pressure through a lubricant filled distributing conduit system, which delivers to the respective bearings through flow restricting metering outlets, each of which preferably imposes an invariant resistance to flow in accordance with the relative requirements of the bearings.

Such a system, even though involving conduits of considerable length, is substantially equipotential as to pressure. The predetermined relative rates of flow through the various metering outlets remain constant under all operating conditions, but the absolute flow rates through the outlets are a function solely of the pressure on the system and the viscosity of the lubricant therein.

In accordance with a preferred embodiment of the invention the central lubricant reservoir is suitably supported on or adjacent the machinery to be lubricated, preferably below the lubricant outlets of the system. A force pump preferably of the continuously operating rotary impeller type and in most instances, operated from or synchronously with the machinery to be lubricated is associated with the reservoir, or otherwise disposed so that it may pass lubricant from the reservoir into the conduit system under pressure. The conduits of the system are of a cross sectional area, which is large as compared with the restricted pressure outlets. These restricted outlets may be drip plugs of the general character disclosed in prior Patent No. 1,632,772, dated June 14th, 1927, each drip plug being rated or calibrated in accordance with the relative needs of its particular associated bearing, the plugs cooperatively imposing a flow resistance far in excess of the flow resistance of the conduits themselves and sufficient to set up a back pressure on the lubricant.

A major problem is to permit accurate expeditious initial predetermination or calibration of the absolute flow rate through the plugs in accordance with the needs of the machine and to permit convenient and expeditious readjustment whenever for any reason, the flow rate varies materially. The present apparatus and method solve both of these problems effectively and simply.

I preferably provide a pump of a capacity in excess of that required by the drip plug outlets; and provide a bypass back to the reservoir for the excess oil, the size and the corresponding flow resistance of the bypass orifice being adjusted to insure proper subdivision of the oil stream which flows partly to the bearings and partly back to the reservoir.

According to the method which I prefer the size of the bypass (and its corrollary, the pressure in the system) is controlled by a spring pressed valve which automatically checks drainage when the pump is not working. The resistance of this valve to flow through the bypass may be conveniently regulated manually so that the amount of oil flowing through the bypass (i. e., the size of the bypass opening) is a function primarily of the spring pressure on the valve. Thus by merely adjusting the pressure on the valve, the absolute flow rate through the drip plugs is variable all the way from a negligible leak or seepage to a substantial squirt of oil. In practice, for instance, it may be found that for a given viscosity of oil, a pressure of 10 pounds per square inch must be maintained in the conduit system to insure adequate flow to the bearings. It is merely necessary, therefore, (assuming flow resistance through the main length of the bypass to be negligible) to set the valve in the system at a 10 pound pressure whereby the valve will find equilibrium in a substantially balanced condition (due to oil pressure on one side and spring pressure on the other). The proper amount of lubricant will be fed to the bearings and the excess will be passed directly back to the reservoir through the bypass.

Since the absolute flow rate of oil of a given viscosity cannot vary without an accompanying variation in pressure in the conduit system, an ordinary pressure gauge in the system will afford a ready indication of flow variations.

In the initial calibration or setting of the valve, I preferably employ a visual drip cock to which oil passes through a conventional drip plug forming part of the system.

When the system is installed on a machine, or group of machines the relative lubricant needs of each bearing are calculated in advance, but the most desirable absolute flow rate to the bearings is determined by actual tests. With the system installed and filled with lubricant the regulating valve is adjusted until the amount of lubricant supplied to each bearing seems to be the amount desired. At this time the drip cock may be observed and the number of drops of lubricant flowing from the drip cock in a minute, or other selected unit of time are noted. The pressure in the system is also noted. For the sake of illustration, the cock may be dripping ten drops per minute and the pressure gauge may show 10 pounds of pressure.

In normal running of the machine, absolute flow rate may vary due to temperature changes, by wear on the pump, or from other causes. If it does vary the gauge will show a corresponding variation. Accurate readjustment may be effected by adjusting the pressure on the control valve until such time as the drip cock again shows the desirable 10 drops per minute. The new reading of the gauge is again noted and any further variations may be detected and remedied by observation of the gauge and readjustment of the valve.

In a preferred embodiment of the invention, the reservoir, the pump, the by-pass and preferably the gauge and drip cock are associated in a unitary construction, and oil from the reservoir is passed to the pump through a filter.

The invention may be more fully understood from the following description in connection with the accompanying drawings, wherein;

Fig. 1 is a somewhat diagrammatic view of a press equipped with my lubricating system;

Fig. 1a is a longitudinal sectional view through a typical outlet fitting of the drip plug type.

Fig. 2 is a top plan view of the pump and reservoir unit;

Fig. 3 is a vertical sectional view taken therethrough on the staggered line 3—3 of Fig. 2;

Figure 4:
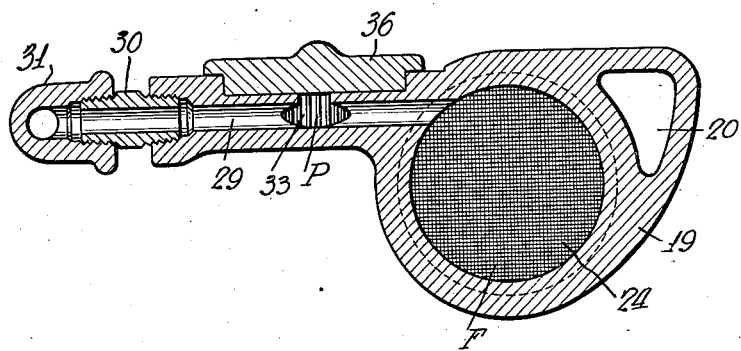
Fig. 4 is a sectional plan view taken on the line 4—4 of Fig. 3.

In Fig. 1 is shown a diagrammatic view of a stationary machine installation equipped with my improved lubricating system. The machine, illustratively shown as a press, has mounted thereon at any suitable point, a lubricant reservoir R from which lubricant is pumped through a system of distributing conduits C, C' and C², extending along the frame structure of the machine to the various bearings B thereof. The flow of lubricant from the conduit system to the bearings is through highly restricted flow passageways, such as those afforded by the drip plugs D. One typical drip plug construction is illustrated in Fig. 1a.

Such a drip plug may conveniently comprise the fitting 10 with a threaded end 11 for application at the bearing. High resistance to flow is determined by a pin 12 nearly filling the longitudinal bore of the fitting. A strainer plug 13 of wool felt is provided at the inlet end of the fitting and backed by wire mesh cup 14 to intercept any solid particles entrained with the oil, which might otherwise reach the restriction crevice. Mounted in a socket at the outlet end of the body is a flap valve 10a, comprising a disk having limited movement between its seat 10b and retainer member 10c. The valve permits free emission from the drip plug but is sucked back against its seat whenever any interpipe siphoning action tends to cause suction in the line of which the valve serves as outlet. A suitable compression coupling indicated generally at 15 serves to connect the outlet pipe to the drip plug. The diameter of the pin 12 determines the rating of the fitting, and in operation, the drip plugs proportion the distribution of lubricant to the various bearings.

As best seen in Fig. 3, lubricant from the reservoir flows through a filter chamber F to the force pump P. The lubricant expelled by the pump flows through two courses, one into the conduit system and the other through the by-pass A back to the reservoir. Flow through the bypass is regulated by a control valve V, the spring pressure on which is adjustable by knob K to determine the pressure in the conduit system.

The reservoir includes a pair of slightly telescoped and lap welded cup members 16, the upper of which provides a filling neck 17 normally closed by a vented cap 18. A base casting 19 is fitted and secured in a suitable opening in the lower cup 16 and defines a pocket or well 20 through which lubricant flows to the filter chamber F.

This filter chamber is defined by a downwardly facing socket 21 in the casting, into the bottom of which is screwed a cup-like plug 22. The filter pad 23, covered by screen 24, is pressed against an annular shoulder 25 at the top of the filter chamber by the upper edge of a cylindrical clamping collar 26 of less diameter than the filter chamber and defining with the walls thereof an annular oil inlet space 27 into which oil from the well 20 flows through the passage 28, and from which the filter chamber F is supplied through apertures 28'.

A horizontal passageway 29 in the base casting communicates at one end with the chamber F above the filter therein and at the other end receives a fitting 30 connected by T coupling 31 with the inlet end of conduit C from which the various drip plugs are supplied.

Figure 5:
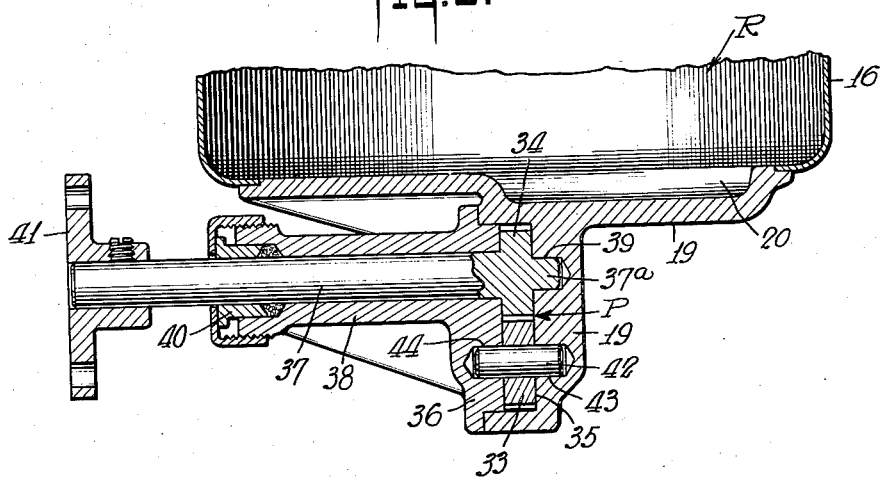
Fig. 5 is a vertical sectional view taken on the line 5—5 of Fig. 3.

The vertical bypass A communicates at its lower end with the passageway 29. Between the bypass and the inlet of passageway 29, the force pump, preferably a gear pump P is disposed. The intermeshing gears 33 and 34 of the pump are arranged in suitable recesses 35 in the base casting which is closed by a cover plate 36, (Figs. 4 and 5) to complete the gear case.

Preferably the upper driving gear 34 of the pump P is formed integral with a driving shaft 37 (Fig. 5) journaled in a sleeve 38 integral with the plate 36. Shaft 37 has an extension 37$^a$ journaled in a socket 39 in the base casting. Escape of lubricant around the driving shaft 37 is prevented by running this shaft through a stuffing box 40 at the outer end of the sleeve 38. The projecting shaft end carries a coupler 41 of any suitable type adapted to be drivingly connected to any moving part of the press or to press actuating or actuated mechanism. The driven gear 33 of the pump turns with or on an axle 42, the ends of which are journaled in bearing sockets 43 and 44 in the base casting 19 and plate 36, respectively.

The valve V (Fig. 3) preferably comprises a valve disk 45, the annularly concave rim of which coacts with an upwardly facing convex seat 46 at the top of the bypass passageway A. The upper end of this passageway is enlarged at 47 to accommodate the enlarged spider hub 48 of the valve.

The vertical valve operating rod 49 has at its lower end a ball and socket connection 50 with the valve V. The upper end of this rod is guided in a tube 51, the upper threaded end of which is axially adjustable through an internally threaded plug member 53 screwed into a collar 54 fixed to the top of the reservoir. Tube 51 is adjustable axially by turning the knob K at its upper end and may be locked in any desired position of adjustment by the lock nut 55 having an operating handle 56.

The tube 51 is provided with an inwardly spun rib portion 57 encircling the reduced portion 58 below head 58' of the rod 49, thereby to prevent disconnection of the rod from the tube. At its lower end the tube 51 carries a head 59 flanged over a cylindrical spring housing 60. A coiled expansion spring 61 reacting against the head 59 urges a free sliding collar 62, which encircles the rod 49 against a cross-pin 63 in the rod and thereby normally holds the valve in seated position.

For illustrative purposes, I have shown the conduit C leading downwardly (Fig. 1) and connected through a T fitting 64 with the flow conduits C' and C$^2$, which convey lubricant to the various bearings of the machine, all of which are disposed above the level of the reservoir.

In the ordinary course of operation, the reservoir R is filled with oil and the pump P being driven from the machine, first fills the conduit system with oil and then starts to force oil through the various drip plug outlets to the bearings. For oil of any given viscosity, the absolute flow rate through the drip plugs is a function of the pressure existing in the system. By simply turning the knob K and decreasing or increasing the tension on spring 61, valve V may be set to maintain any pressure desired in the system. Under ordinary conditions, the most desirable absolute flow rate through the drip plugs is first ascertained; the pressure necessary to maintain such rate is determined; the valve is set to maintain such pressure in the system and the excess lubricant furnished by the pump beyond that required to maintain said line pressure, by-passes back to the reservoir around the valve V. In operation, this valve is maintained in a position of balance with the spring pressure on one side equally balancing the fluid pressure on the other side. The valve thus determines the effective cross sectional area of the bypass, or in other words, determines what proportion of the lubricant fed from the pump shall return to the reservoir.

For purposes of the present invention, the pump may be assumed to be continuously in operation, while the machine is in motion and to supply a uniform volume of oil per unit of time for any given running speed of the machine. Should the oil become more viscous due to cold, for instance, the added resistance to flow through the drip plug will result in increased back pressure in the system. Valve V will therefore open further and permit a larger proportion of the oil to return to the reservoir, the flow rate through the drip plugs being correspondingly reduced. When this condition of variation in the absolute flow rate is noted, it may be remedied by turning the knob K to increase the pressure on the valve, thereby stepping up the pressure in the system to the extent needed for continued maintenance of the desired flow rate through the plugs. Similarly a decrease of oil viscosity will result in over oiling of the bearings, which will be remedied by reduction of the spring pressure on the valve.

Indicating means is preferably provided firstly to expedite and facilitate the original calibration of the flow rate, secondly, to afford a ready visual indication of any variations during operation in the pressures existing in the conduit system, and thirdly to facilitate readjustment or recalibration after changed conditions.

The calibration indicator is preferably in the nature of a drip cock 70 (Fig. 3) arranged under a glass dome 71 in the top of the reservoir, and supplied from the distributing system by a drip plug outlet, of characteristics similar to those feeding the bearings. The pressure indicator is an ordinary pressure gauge 72. A conduit C$^3$ leading upwardly from the T coupling 31 connects with the head of a second T coupling 74 into which the pressure gauge 72 is screwed. The indicator drip plug D is fixed in the end of passageway 78 in a collar 76 rising from the reservoir top. This passageway is formed in an internal enlargement 77 of the collar. The lower end of the drip cock 70 communicates with this passageway, and the hook shaped upper end of the cock drips into the reservoir and is clearly exposed through the transparent dome 71.

Figure 6:
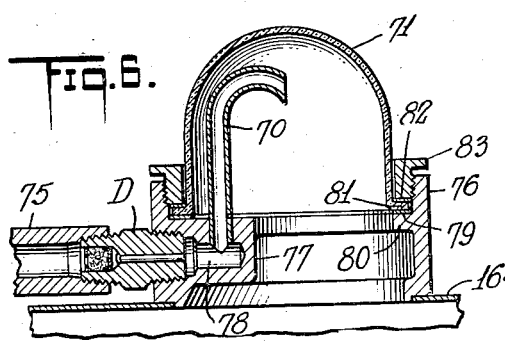
Fig. 6 is a vertical sectional view through the drip cock and associated mechanism.

The dome may rest on a rubber packing ring 79, (Fig. 6) laid upon an internal flange 80 of the collar 76. The flanged lower end 81 of the dome is clamped between ring 79 and a superimposed ring 82, the latter being forced home by a bushing 83, screwed into the top of the collar.

The drip plug D which supplies the drip cock 70 which drips directly into the reservoir, may be of any desired rating, since it is only of interest to note the number of drops of oil per unit of time flowing from the cock 70 when the desired flow rate to the various bearings has been established.

The various bearings fed from the distributing system being equipped with drip plugs of flow resistances proportioned to the respective bearing requirements, the valve V is adjusted until the flow to the bearings or to any one bearing is correct. When this desired rate of supply has been established, a uniform rate of drip will be occurring from cock 70. The rate of drip from the cock may be timed in drops per minute or fraction thereof.

While the system is in operation, any variation in the absolute flow rate to the bearings will be accompanied by a variation of pressure in the system so that casual observation of the gauge will always determine whether or not the desired flow rate is being maintained.

When from any cause the flow rate varies and the gauge registers a higher or lower pressure, resetting of the valve to compensate for the variation is accomplished rapidly and accurately by simply adjusting the valve V to a point where the rate of drip from the cock 70 comes back to normal.

When the machine is at rest the oil in the conduit system will be under no substantial pressure. It will have little or no tendency to drain back to the reservoir, however, since the valve V will be seated, the impelling teeth of the gear pump will tend to block such flow and the filter pad itself will offer a strong flow resistance. Furthermore, the suction flap valves at the drip plugs will be drawn against their seats to stop any incipient backflow tendencies in the distributing lines.

The pressure gauge shows immediately when the reservoir is empty and requires replenishment, although an ordinary liquid level indicating column might be used, and the well 20 serve for a reserve supply of oil if the low level on the glass were not immediately noted.

One of the noteworthy features of the system is the fact that it functions independently of the quality or character of the oil which is used, since the valve adjustment will readily take care of changed conditions due to the introduction of a different grade of oil.

With the present installation, either a valveless drip plug, a flap valve drip plug or a valved drip plug seated by a very light spring are used rather than drip plugs embodying strong spring pressed check valves, since under many conditions it may be possible to operate the system at pressures which are actually lower than the pressures which would be required to open such check valves.

With the foregoing description, it will be obvious that not only novel apparatus but also novel methods, particularly controlling methods are embraced in the invention. These methods are effective to permit a single adjustment to care for varying flow conditions resulting from any cause and to facilitate both initial predetermination and quick, accurate redetermination of the flow rate.

By the expression drip plug utilized in the accompanying claims is meant an outlet or restriction fitting having a sufficiently high resistance to effect proper distribution between the various bearings.

I claim:

1. A lubricating system including in combination a central lubricant reservoir, a system of distributing conduits having invariant flow restricting outlets at the bearings to be lubricated, rated for uniformly proportional lubricant distribution at all rates of flow, a continuously operating pump for forcing lubricant into the distributing system, and adjustable means for predetermining the absolute rate of flow of lubricant through the outlets, and means to indicate variations in the predetermined absolute flow rate.

2. A lubricating system including in combination, a central lubricant reservoir, a system of distributing conduits having flow restricting outlets at the bearings to be lubricated, rated for uniformly proportional lubricant distribution at all rates of flow, a continuously operating pump for forcing lubricant into the distributing system, adjustable means for predetermining the absolute rate of flow of lubricant through the outlets, a pressure gauge to indicate variations in the pressure in the system, and a visible volume measuring means to indicate the extent of readjustment necessary for reestablishing the desired rate of flow.

3. The combination with a lubricating system of the character which includes a central reservoir, a pump, a distributing conduit receiving lubricant from the pump and drip plug outlets in the conduit rated to assure proportional flow of lubricant therethrough, and so highly restricted that absolute flow rate therethrough, is a function of the pressure and viscosity of the oil in the system, of means for indicating the pressure in the system, means for adjusting such pressure to compensate for variations in the absolute flow rate, and means for indicating when the pressure controlling means has been adjusted through a range sufficient to reestablish a previously determined flow rate.

4. The combination with a lubricating system of the character which includes a central reservoir, a pump, a distributing conduit receiving lubricant from the pump and drip plug outlets in the conduit rated to assure proportional flow of lubricant therethrough, and so highly restricted that absolute flow rate therethrough is a function of the pressure and viscosity of the oil in the system, of means for indicating the pressure in the system, means for adjusting such pressure to compensate for variations in the absolute flow rate, and means for indicating when the pressure controlling means has been adjusted through a range sufficient to re-establish a previously determined flow rate, the second indicating means comprising a visible flow volume indicator receiving lubricant from one of the outlets of the system.

5. A lubricating system including in combination a central reservoir, a distributing conduit therefrom having drip plugs of invariant high flow resistance at the bearings to be lubricated, the effective flow area of the plugs being small enough to create a back pressure in the conduit, means for forcing lubricant from the reservoir into the conduit, and means to selectively predetermine the pressure in the conduit and thereby regulate the absolute flow rate of lubricant through the outlets, said means including a return flow arrangement to the reservoir and a manually controlled valve to regulate the amount of lubricant passing through said return flow arrangement including spring seating means, a manual control button and a threaded adjustment, said manual control button being placed externally of the reservoir and actuating the threaded adjustment which is positioned inside of the reservoir.

6. A lubricating system including in combination a central reservoir, a distributing conduit therefrom having valveless drip plugs at the bearings to be lubricated, the effective flow area of the plugs being small enough to create a back pressure in the conduit, means for forcing lubricant from the reservoir into the conduit, and means to selectively predetermine the pressure in the conduit and thereby regulate the absolute flow rate of lubricant through the outlets, said means comprising a spring loaded valve in the reservoir and adjustable exteriorly thereof, controlling the pressure exerted on the lubricant in the conduit, and a bypass for excess lubricant from the conduit back to the reservoir, said bypass being controlled by said valve.

7. A lubricating system including a reservoir, a pump, a distributing conduit into which lubricant from the reservoir is continuously forced by the pump, a plurality of drip plugs through which oil is distributed from the conduit, a bypass from the conduit to the reservoir, an adjustably spring loaded valve controlling flow through the bypass, means for indicating the pressure in the conduit and a flow volume indicator fed from one of the drip plugs.

8. A lubricant supply and feed unit for central lubricating systems including a lubricant reservoir and a pump, a flow passage from the reservoir to the intake side of the pump and a filter means therein, a flow passage from the discharge side of the pump and a bypass arrangement provided with fixed and variable restrictions connecting said last mentioned passage with the reservoir, said bypass arrangement including two bypasses, one containing the fixed restriction and the other containing the variable restriction, said bypass arrangement also including an indicator associated with said fixed restriction to indicate the flow therethrough.

9. A lubricant supply and feed unit for central lubricating systems including a lubricant reservoir and a pump, a flow passage from the reservoir to the intake side of the pump and a filter means therein, a flow passage from the discharge side of the pump and a bypass arrangement connecting said last mentioned passage with the reservoir, said arrangement including fixed and variable restriction means, the variable restriction means including a spring loaded valve, and means for adjusting the pressure on said valve, said bypass arrangement including two bypasses, one containing the fixed restriction and the other containing the variable restriction, said bypass arrangement also being provided with means to indicate the flow through the fixed restriction.

10. A lubricant supply and feed unit for central lubricating systems including a lubricant reservoir and a pump, a flow passage from the reservoir to the intake side of the pump and a filter means therein, a flow passage from the discharge side of the pump, a bypass connecting said last mentioned passage with the reservoir, and fixed and adjustable flow restricting means controlling said bypass, said bypass being provided with two return flow passages respectively containing fixed and adjustable restricting means, said bypass being provided with means to indicate the flow through said fixed restricting means.

11. A supply and feed unit for central lubricating systems including a reservoir including a casting, a passageway leading from the reservoir through the casting, said passageway embodying a filter means and a gear pump controlling flow through said passageway, the latter communicating with the reservoir at the intake side of the pump and through a valve controlled bypass in the casting with the reservoir at the discharge side of the pump.

12. A central lubricating installation for a mechanism having a plurality of bearings comprising a branched distributing piping system having a single inlet and a plurality of outlets, all except two of which lead to said bearings, high resistance invariant inadjustable restrictions positioned upon all of said outlet branches leading to said bearings, a variant adjustable restriction positioned upon one of the branching outlets not connected to a bearing, means to visually indicate the rate of flow through said flow proportioning restrictions to enable adjustment of said adjustable restriction and a pump unit to feed lubricant into the inlet of said piping system, said visual indicating means being positioned in the other one of said two outlets.

13. A central lubricating installation for a mechanism having a plurality of bearings comprising a branched distributing piping system having a single inlet and a plurality of outlets, all except two of which lead to said bearings, high resistance flow proportioning restrictions positioned upon all of said outlet branches leading to said bearings and upon one of the branches not leading to said bearings, a spring seated check valve positioned upon the other branch outlet not connected to a bearing, means to adjust the seating pressure of said spring seated valve, means to visually indicate the rate of flow through said flow proportioning restriction not connected to a bearing so as to determine the adjustment of said spring seated valve, and a combined reservoir and pump unit to feed lubricant into the inlet of said piping system, said two outlet branches not feeding bearings being arranged to discharge into said reservoir.

14. A central lubricating installation for a mechanism having a plurality of bearings comprising a branched distributing piping system with a single inlet and a plurality of outlets, a combined reservoir and pump unit associated with said inlet, high resistance flow proportioning drip plug outlets associated with all but one of said outlets, an adjustable variable pressure-controlled restricting device associated with the remaining outlet and means to visually indicate the need for adjustment of said adjustable device.

15. A central lubricating installation for a mechanism having a plurality of bearings comprising a branched distributing piping system with a single inlet and a plurality of outlets, a combined reservoir and pump unit associated with said inlet, high resistance flow proportioning drip plug outlets associated with all but one of said outlets, a variable pressure-controlled restricting device associated with the remaining outlet, said remaining outlet and at least one of said drip plug outlets being arranged to discharge into said reservoir, and being provided with a visual drip discharge and the remaining outlets being arranged to feed lubricant to the bearings of said mechanism.

16. In a central lubricating installation of the type having a branched distributing piping system, a single inlet and a plurality of outlets, a plurality of high resistance flow proportioning drip plugs associated with said outlets and a pump unit connected with said single inlet; the combination therewith of an absolute flow indicating device enabling rapid and accurate adjustment of the rate of feed through said system comprising an additional outlet from said distributing system, a drip plug upon said outlet and visual indicators upon said outlet before and after said drip plug respectively to indicate the pressure exerted upon said drip plug outlet, and the rate of flow past said drip plug.

17. In a central lubricating installation of the type having a branched distributing piping system, with a single inlet and a plurality of outlets, a plurality of high resistance flow proportioning drip plugs associated with said outlets and a pump unit connected with said single inlet; the combination therewith of a flow and pressure controlling arrangement comprising visual means to indicate the pressure upon and the rate of flow through said system, an additional outlet provided with spring seated valve and means to adjust the seating pressure of said spring seated valve.

18. In a central lubricating installation of the type having a branched distributing piping system, with a single inlet and a plurality of outlets, a plurality of high resistance flow proportioning drip plugs associated with said outlets and a combined pump and reservoir unit connected with said single inlet; the combination therewith of a flow and pressure controlling arrangement comprising two additional outlets from said distributing system discharging into said reservoir, a drip plug upon one of said outlets and a spring seated valve upon the other of said outlets, means to adjust the seating pressure of said spring seated valve and a visual indicator on the additional drip plug outlet respectively before and after said drip plug to indicate the pressure exerted upon the drip plug and the rate of feed past the drip plug, whereby satisfactory manual adjustment may be made to obtain the desired rate of feed.

JOSEPH BIJUR.